May 19, 1959  AKIRA MIYATA  2,887,643
CHARGING CIRCUIT FOR A CONDENSER
Filed March 20, 1956  3 Sheets-Sheet 1

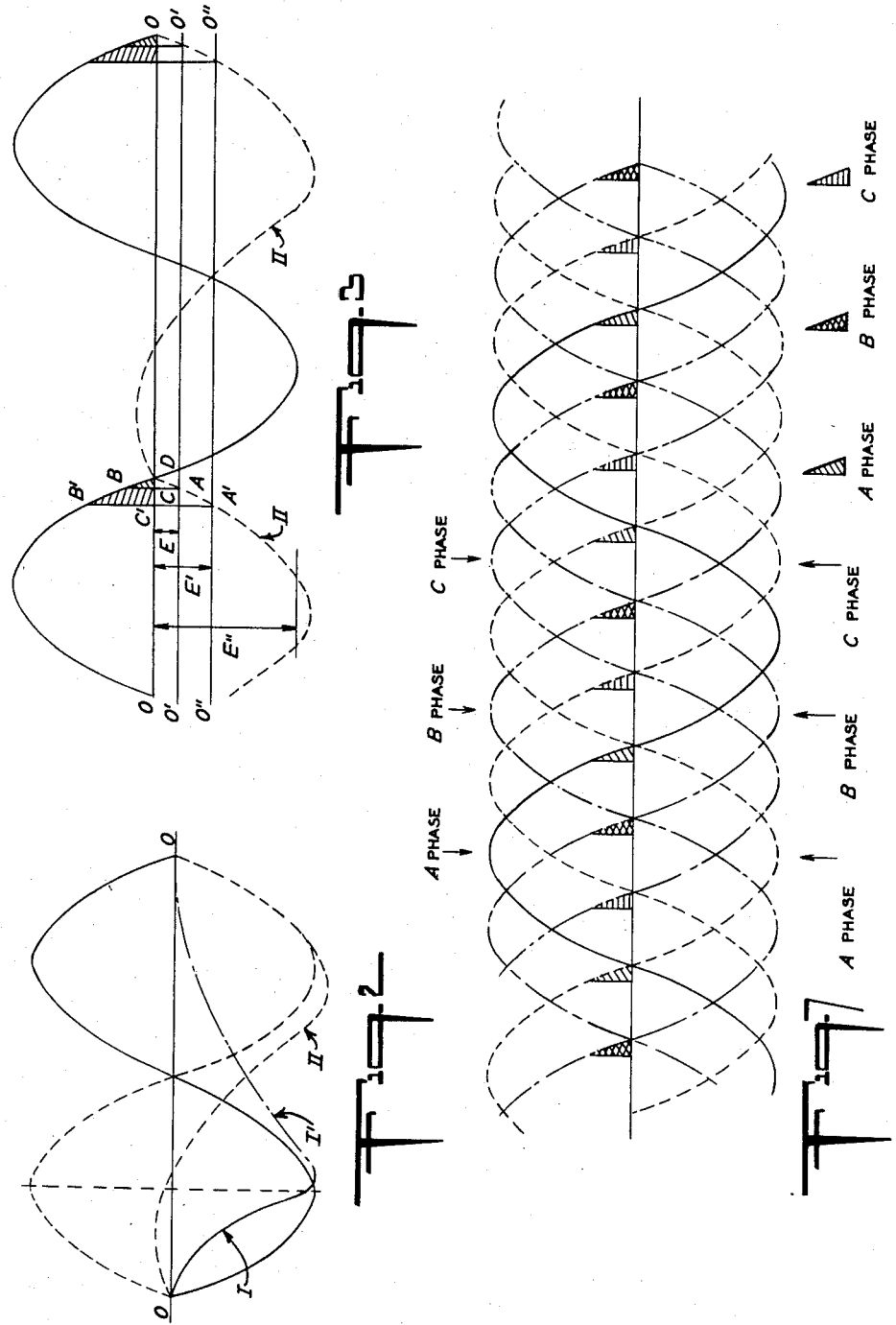

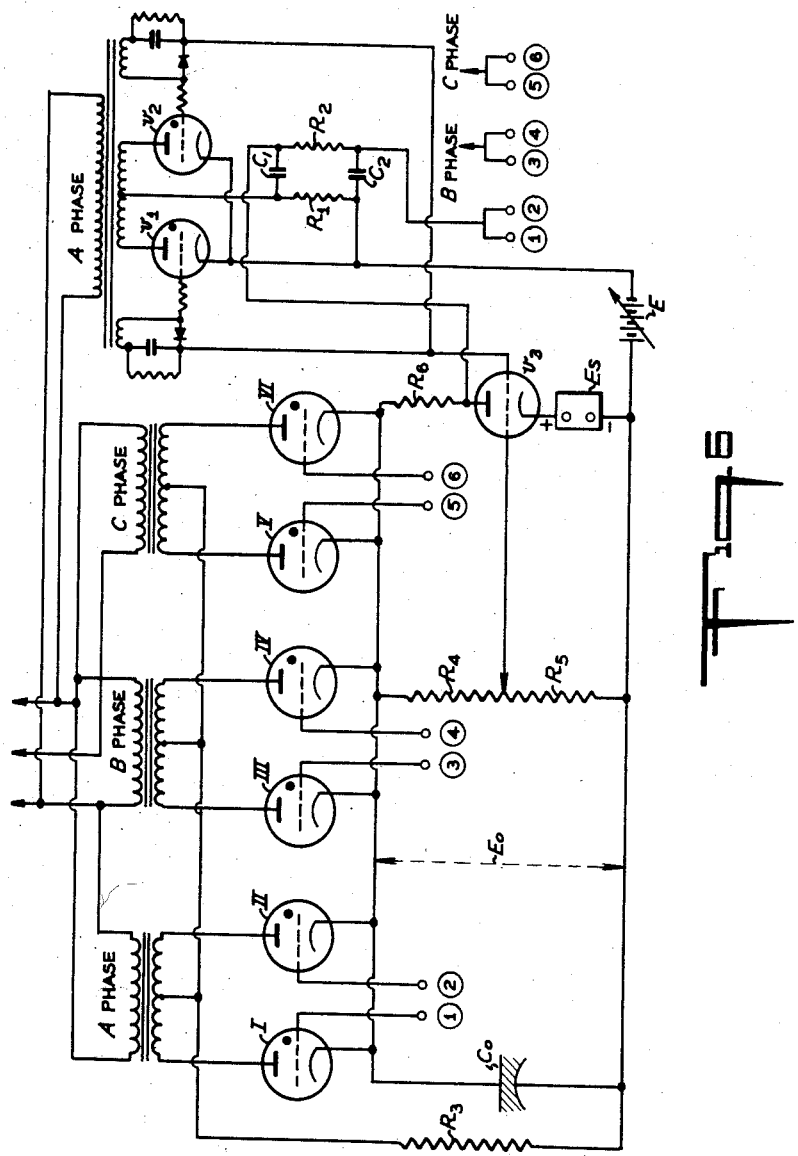

United States Patent Office 2,887,643
Patented May 19, 1959

2,887,643

CHARGING CIRCUIT FOR A CONDENSER

Akira Miyata, Tokyo, Japan, assignor to Scientific Research Institute Ltd., Tokyo, Japan Application March 20, 1956, Serial No. 572,766

Claims priority, application Japan November 7, 1955

4 Claims. (Cl. 320—1)

The present invention relates to charging circuits for condensers of large capacitance.

This invention has as an object the provision of a device to control a main charging thyratron to fire at a predetermined voltage upon receiving a signal pulse from a controlling thyratron, thereby to cause the maximum permissible current to flow with minimum power loss.

In this improved charging device, the main charging thyratron can always work at maximum current during the whole charging period and the associated resistance through which charging is effected can be selected to have the possible smallest value to decrease its power dissipation. Thus, it is possible to make use of the full capacity of a thyratron and even a condenser of large capacitance can be charged quickly and efficiently with low input power.

A further object of the invention is to provide a simple automatic voltage regulating device. By this device, the charging of the capacitor stops automatically at an assigned voltage, which is kept constant thereafter irrespective of the fluctuation of voltage supply and of the leakage of the capacitor itself. This process is realized in that a part of the capacitor voltage, which increases gradually during charging, is amplified by a vacuum tube having as its plate voltage the capacitor voltage itself or an independent source, and this amplified voltage with reversed polarity is impressed on the grid of the main thyratron to stop its firing.

A principal object of the invention is to provide a device in which six main charging thyratrons are divided into three groups respectively corresponding to each phase of a three phase A.C. source, each group providing full wave rectification, and thyratrons are provided to control the said groups at an assigned voltage and regularly to charge the condenser with a maximum permissible current.

In the drawings:

Figure 2 and Figure 3 show various voltage waves illustrating the characteristic action of the above circuit.

Figure 6 shows a circuit of this invention for a three phase A.C. source.

Figure 7 shows various voltage waves illustrating the performance of the circuit shown in Figure 6.

In the drawings like reference numerals indicate like parts throughout.

The present invention provides for quickly charging a condenser of large capacitance with the highest efficiency at a low input power.

Figure 1:
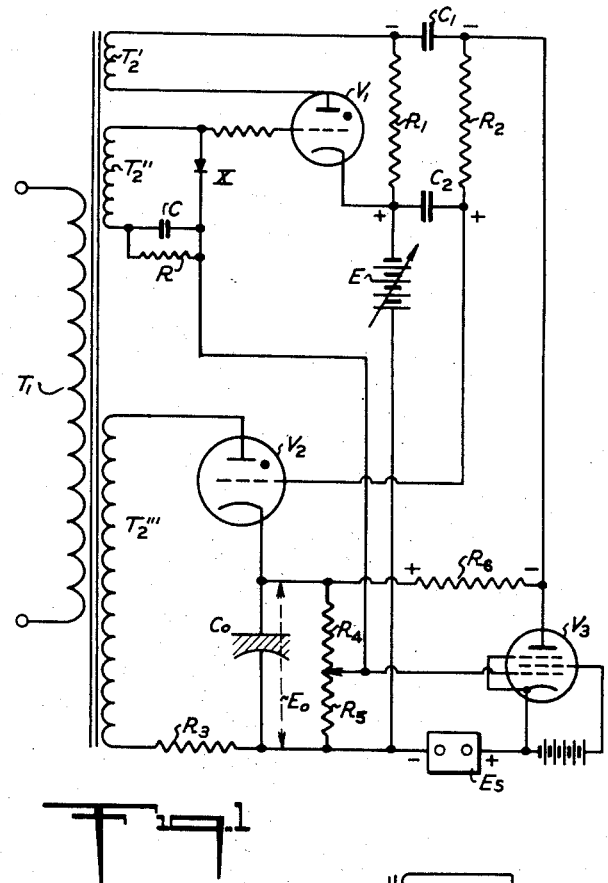
Figure 1 shows a circuit of this invention for a single phase A.C. source.

In Figure 1, $T_1$ is a primary winding of a single phase A.C. transformer connected to power source, and two secondary windings $T_2'$ and $T_2''$ respectively, for the plate voltage and the grid voltage of control thyratron $V_1$, provide voltages differing in phase angle by 180 degrees or more; the upper terminal of the winding $T_2''$ or the grid terminal is coupled by a rectifier X to the lower terminal of the winding to pass current in the direction of the latter terminal; with a C–R parallel circuit in series with the rectifier, the circuit of the secondary winding $T_2''$ is completed. In the said C–R circuit, resistance R is connected in parallel with capacitor C in such a manner that it provides a time constant of $1/f$, in which $f$ is the frequency of the power source. Resistance $R_1$ is in the plate circuit of thyratron $V_1$ and is connected to its cathode. The plate of a main charging thyratron $V_2$ is connected to the upper terminal of the secondary winding $T_2'''$, which has the same phase as the secondary winding $T_2'$. Condenser $C_0$ of large capacitance and which is to be charged and charging resistance $R_3$ in series are connected between the lower terminal of the winding $T_2'''$ and the cathode of tube $V_2$. Across the same condenser is shunted a voltage divider consisting of resistance $R_4$ and resistance $R_5$. An adjustable D.C. constant potential source E is inserted between the cathode of controlling thyratron $V_1$ and the lower terminal of the resistance $R_5$, said D.C. source making the cathode negative. Through the said R–C circuit, the dividing point of voltage divider $R_4$ and $R_5$ is connected to the lower terminal of the winding $T_2''$. Both terminals of resistance $R_1$, which is in the plate circuit of thyratron $V_1$, are connected respectively via capacitors $C_1$ and $C_2$ to the terminals of resistance $R_2$. The lower terminal of resistance $R_2$ is connected to the grid of main thyratron $V_2$, and the other terminal is connected to the cathode of the tube $V_2$ through resistance $R_6$.

When the terminal of winding $T_2''$, to which the grid of thyratron $V_1$ is connected becomes positive, a negative potential exists at the plate of the tube $V_1$ as no current flows in the control thyratron $V_1$. During this period, the rectifier X passes current to charge the condenser C to make its transformer side negative, and this charging process continues until the maximum of the voltage wave of the grid transformer it attained, as shown in Figure 2. Referring to Figure 2, the condenser voltage rises along the curve I, but after the grid transformer voltage leaves the maximum point, it declines along the chain line curve I' in accordance with the given time constant, for the rectifier does not permit the flow of current in the reverse direction from the condenser, the voltage of which is greater than the voltage of the transformer during the period. As a consequence, the grid receives the sum of the voltage of the transformer and that of capacitor C as shown by dotted lines curve II (in this case, the potential difference in resistance $R_5$ and that of D.C. source E is neglected); in other words, curve II is positive at the beginning of the half period when the plate voltage becomes negative, and is negative in the latter part of the period because of the stored charge. Thus, current never flows in the control thyratron $V_1$ during this half period; however, at the beginning of the subsequent half period when the plate voltage becomes positive, the grid voltage is also negative due to the voltage of the condenser C being substantially equal to the maximum transformer voltage. Subsequently, it becomes negative following approximately along the sine wave voltage of the winding $T_2''$, because the stored charge suddenly diminishes according to the time constant. In either case, current does not flow through thyratron $V_1$.

The adjustable D.C. constant voltage source E, is inserted between the cathode and the grid of control thyratron $V_1$ to make the grid voltage more positive.

The grid voltage being shifted by source E, the curve in Figure 3 illustrates the zero line as displaced from the position O—O to a new parallel position O'—O'. Thus from the time when the grid voltage intersects this line at point A, it becomes positive for the half period of positive plate voltage, and thyratron $V_1$ is fired and current flows until the plate voltage curve intersects the line O—O at point D. When the adjustable voltage E is increased to E', displacement of the zero line is extended to the position O''—O'', and thyratron $V_1$ is fired at point A' where the grid voltage intersects the straight line. The values of voltages E and E' are proportional to the heights BC and B'C' respectively (AB and A'B are drawn perpendicularly to the line O—O). In short, thyratron $V_1$ is fired at the instant when the plate voltage goes down to the given value which is proportional to E or E'. Even when the value of E is elevated to E'', it is easy to fire the thyratron at the maximum value of the plate voltage, though proportionality may be somewhat impaired.

In this way, control thyratron $V_1$ can be fired at a given potential previously determined to be proportional to E; the impulse produced in resistance $R_1$ at the instant of current flow is transferred to resistance $R_2$ by coupling condensers $C_1$ and $C_2$, and this, in turn, induces the firing of main thyratron $V_2$. The starting voltage of the main thyratron corresponding to E is taken to be equal to the product of charging resistance $R_3$, which should be as small as possible for maximum permissible current in the main thyratron.

At the beginning of the charge period, the voltage of capacitor Co, which is to be charged, of course remains zero, and this condenser voltage does not contribute any potential to the grid of control thyratron $V_1$. Accordingly, the main thyratron $V_2$ starts its action only with an initial voltage corresponding to E, and thus maximum permissible current begins to flow to charge capacitor Co until the plate voltage goes lower than the capacitor voltage. In the subsequent half period of positive plate voltage, as capacitor Co has already been charged to maintain its voltage Ec, it contributes a potential $$\frac{R_5}{R_4+R_5}Ec$$

due to the voltage divider to add to E at the time of starting of thyratron $V_1$ and thyratron $V_2$. If the ratio $R_4$ to $R_5$ is properly determined to make the potential rise in the firing voltage of main thyratron $V_2$, Ec just counterbalances the condenser voltage Ec. Further, a portion of plate voltage which corresponds to E alone is useful to charge up capacitor Co. Thus, in this second charging period, current flows with the same maximum permissible value to charge the capacitor, and the same phenomenon occurs in the subsequent charging periods so that the main thyratron $V_2$ always can supply maximum current to capacitor Co. This charging process can be continued almost to the attaining of maximum plate voltage. Thus, the charging resistance $R_3$ can be selected to have the possible smallest value to decrease its power requirement during the whole charging period.

Such being the case, full capacity of the thyratron is used and power loss minimized. These facts provide the special feature that even a condenser of large capacitance can be charged quickly and efficiently with low input power.

Moreover, a simple automatic voltage regulating device can also be employed expediently in accordance with the invention. By this device, the charging of a capacitor stops automatically at an assigned voltage, which is kept constant thereafter irrespective of the fluctuation of voltage supply and of the leakage of the capacitor itself. This process is realized in that a part of the capacitor voltage, which increases gradually during charging, is amplified by a vacuum tube having as its plate voltage the capacitor voltage itself or any other independent source, and this amplified voltage is reversed and impressed on the grid of the main thyratron to stop its firing at a suitable point.

One example of this device is shown in Figure 1, where a pentode is used as an amplifier. In the secondary circuit of a single phase A.C. transformer, the main charging thyratron $V_2$, capacitor Co to be charged, and charging resistance $R_3$ are put in series. Capacitor Co is equipped with a voltage divider consisting of $R_4$ and $R_5$, and load resistor $R_6$ is connected to the upper terminal of $R_4$ in the plate circuit. The plus terminal of the adjustable voltage source Es is connected to the cathode of pentode $V_3$, and its minus terminal is connected to the lower terminal of $R_5$, and thus the voltage drop in load resistor $R_6$ is applied negatively on the grid of main thyratron $V_2$.

When the voltage of the adjustable electrical source Es is determined beforehand according to the required charging voltage, the divider voltage $$\frac{R_5}{R_4+R_5}Eo$$

derived from terminal voltage Eo of capacitor Co successively increases during charging until it reaches that of Es, but from the instant when it is going to pass over that of Es, even the smallest amount of the excess voltage is greatly amplified in load resistor $R_6$, which acts negatively on the grid of the main thyratron and checks its firing to stop charging. Any fluctuations of supply voltage cannot threaten the maintenance of constancy in voltage of the capacitor, and any leakage which causes voltage decay of the capacitor is always completely supplemented by an immediate firing of the main thyratron.

Figure 4:
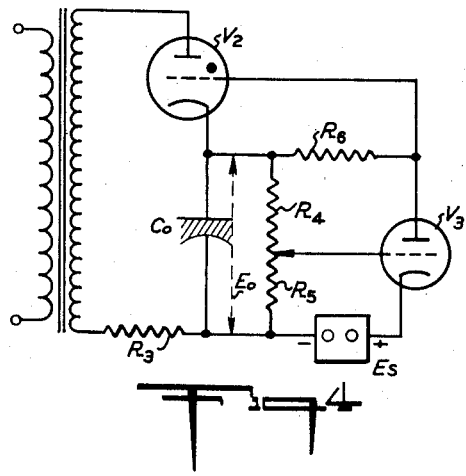
Figure 4 shows a simplified device to charge a condenser automatically.

Figure 4 shows a simplified case utilizing a triode, in which the connections of the main parts are just the same as described above except the vacuum tube. In this example, for the sake of simplicity, the grid of main thyratron $V_2$ is merely connected to its cathode through resistor $R_6$, omitting the control device which was fully described previously. Differing from the case of a pentode, the variation of the plate voltage affects the plate current of triode $V_3$, and any increase of capacitor voltage causes elevation of its grid voltage and an increase of its plate current in cumulative way. Thus, the amplification factor in this case far exceeds that of a mere conventional triode.

Figure 5:
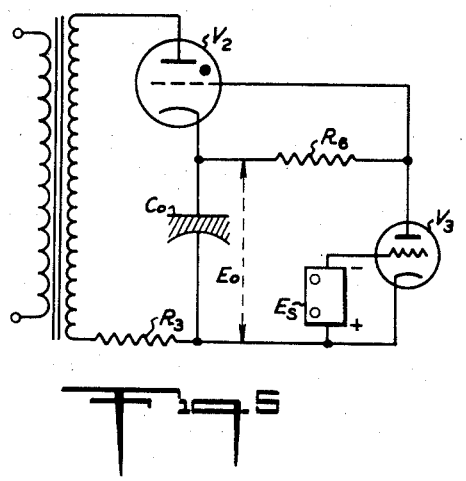
Figure 5 shows a similar device simplified to a further extent.

Figure 5 shows a similar device simplified by employing a triode as before. In this example, the adjustable voltage source Es is only applied to the grid of triode $V_3$ as bias, and the increase of plate current is made entirely dependent on the plate voltage (or the capacitor voltage) alone.

Thus, in the thyratron control charging device, by making use of a simple circuit including an amplifier, the charging can be terminated automatically at a given assigned voltage, which is kept constant irrespective of the fluctuation of supply voltage and of the leakage of the capacitor.

Generally speaking, it is difficult to charge quickly a capacitor of large capacitance in industrial use. This arises from the limitation of the maximum permissible current of the rectifier and the impossibility of realizing the parallel operation of the rectifiers due to their unavoidably different characteristics. In rectification, as the number of phases increases, a more improved form of direct current results, but duty time per tube becomes short, and there is less rectifying efficiency per tube. For example, in the case of 6 tubes, condensers are charged more quickly by being separated in 6 groups or in 3 groups, which are fed individually by half wave or full wave rectifications, than when in a single group which is fed in one lot by a rather smooth 6 phase rectification. However, to achieve good results all groups of condensers must be connected in parallel at the instant of operation. Nevertheless, any difference of potential between the groups of condensers causes serious loss, and the time which elapses between duty periods causes appreciable leakage loss.

According to this invention, however, by making use of the circuit shown in Figure 6, for example, all six main charging thyratrons can be applied to the same condenser as if they were connected in parallel, for each tube acts independently only in the interval when it receives its own signal. Thus, in this case six thyratrons are divided into three groups, I—II, III—IV and V—VI, which respectively provide full wave rectification for A-phase, B-phase and C-phase. In A-phase, for instance, main thyratrons I and II receive the signal to fire at the assigned voltage corresponding to a given potential E, by the impulse of the control thyratron $V_1$ and $V_2$ on resistance $R_1$ which is to be transmitted to resistance $R_2$. The same goes on in turn at different time sequences for the other phases, and when one of the main thyratrons I, II, III, IV, V and VI is fired, the rest of them cannot be fired at the same time due to the phase difference of operation. Their firings occur quite orderly every 60 electrical degrees and never interfere with one another as shown in Figure 7. Thus, by these regular firings, each thyratron charges the capacitor Co with maximum permissible current in an integrating manner according to the starting voltage corresponding to a given potential E. This operation of thyratrons gives the same effect as if they all act in parallel, and the fact that charging resistance $R_3$ can be taken as small as possible, insures a very small power loss, this being the same special feature of the invention as in the case of the previously mentioned single phase device.

Moreover, in the circuit shown in Figure 6, the automatic voltage regulating device providing specified adjustable voltage Es, vacuum tube $V_3$ and resistance $R_6$ can well be applied effectively. As only one such device used in common will suffice and also as the controlling coupling circuit in each phase may be used in common for full wave rectification for both half periods, these assemblies have appreciably simpler connections than even for the three phase case. By applying this automatic voltage regulating device, the charging of the condenser Co is finished exactly at a given assigned voltage corresponding to Es, which is kept quite constant thereafter irrespective of the fluctuation of supply voltage and of the leakage of condenser.

By this invention, one can charge quickly and efficiently a condenser of large capacitance for industrial use, and the applications thereof for the development of welding, magnetization and so on can be realized quite conveniently.

What I claim is:

1. A circuit for charging a condenser comprising a transformer having a plurality of secondary windings, a control thyratron, a charging thyratron, each thyratron having a plate, cathode and grid; a condenser and charging resistance series connected with one of the secondary windings of said transformer and with the plate of the charging thyratron, a voltage divider shunt connected across said condenser, a rectifier, an adjustable voltage source, the cathode and grid of the controlling thyratron being series connected with the adjustable voltage source, a part of said voltage divider and the rectifier, a second secondary winding parallel connected with the rectifier, and means for transmitting a signalling pulse from the control thyratron to the grid of the charging thyratron.

2. A circuit according to claim 1 wherein the voltages in the first and second secondary windings are 180° out of phase.

3. A circuit according to claim 1 and further including means for amplifying the voltage derived from the charged condenser and for applying the amplified voltage reversely on the grid of the charging thyratron.

4. A circuit according to claim 1 for a three phase A.C. source including six charging thyratrons disposed in three groups to provide for full wave rectification in each group and two control thyratrons for each group.

References Cited in the file of this patent

UNITED STATES PATENTS

| | | |
|---|---|---|
| 2,415,944 | Fagen | Feb. 18, 1947 |
| 2,441,822 | Klemperer | May 18, 1948 |
| 2,464,238 | Klemperer | Mar. 15, 1949 |
| 2,467,856 | Rich | Apr. 19, 1949 |
| 2,515,632 | Coffin | July 18, 1950 |
| 2,716,211 | Aas | Aug. 23, 1955 |
| 2,756,378 | Scott | July 24, 1956 |